March 19, 1957 K. B. SORENSEN ET AL 2,785,525
FINDER WHEEL DRIVE
Filed July 16, 1954 2 Sheets-Sheet 2
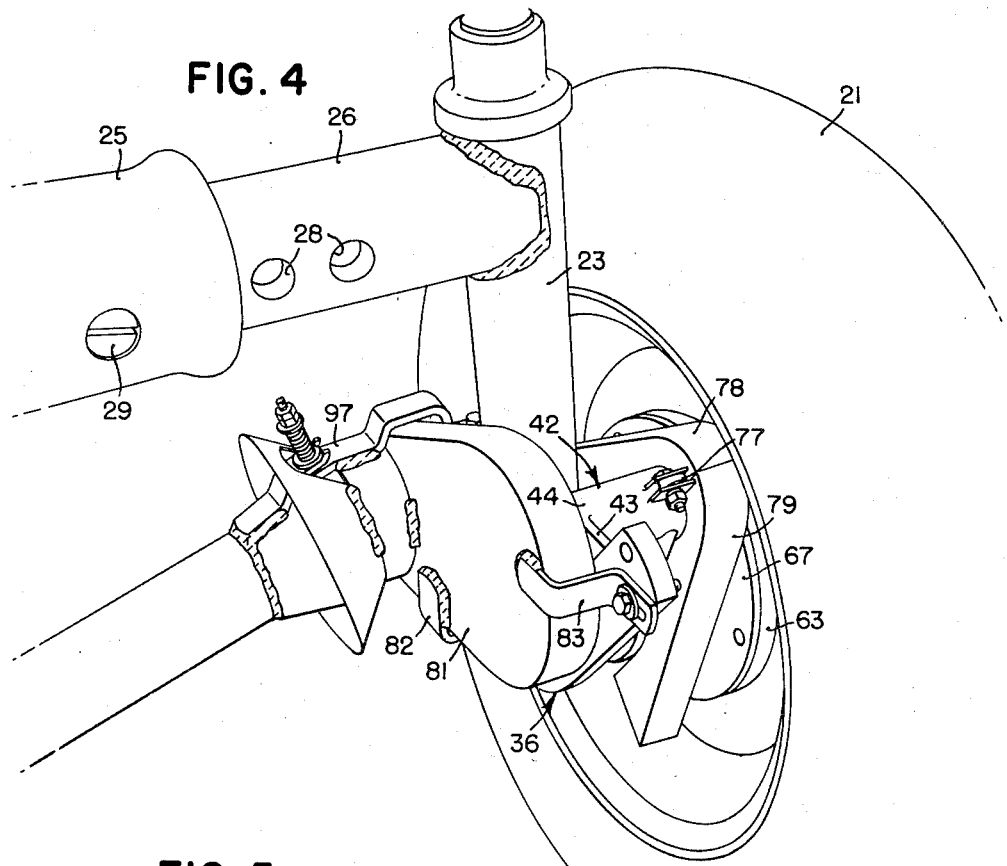
FIG. 4
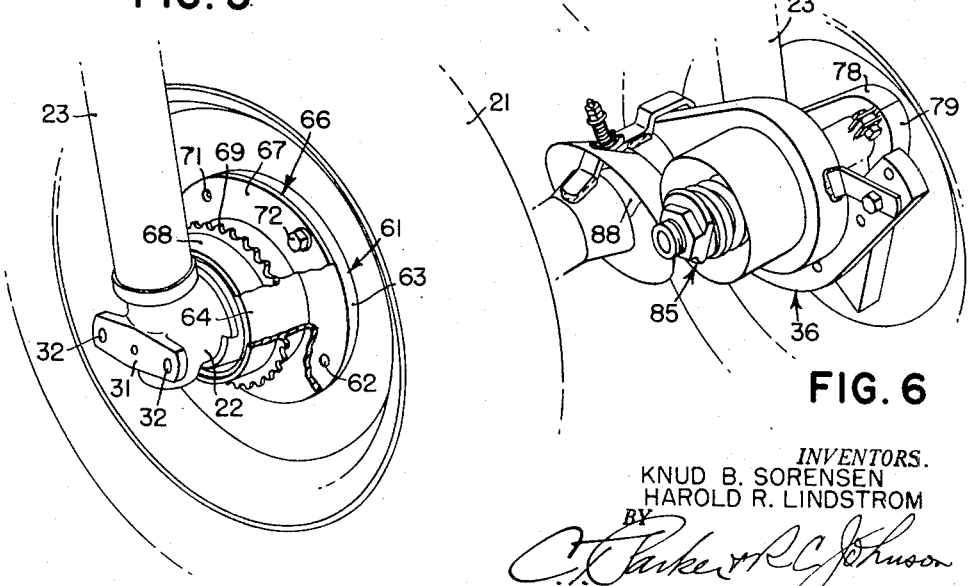
FIG. 5
FIG. 6
INVENTORS.
KNUD B. SORENSEN
HAROLD R. LINDSTROM
BY
ATTORNEYS

United States Patent Office 2,785,525
Patented Mar. 19, 1957

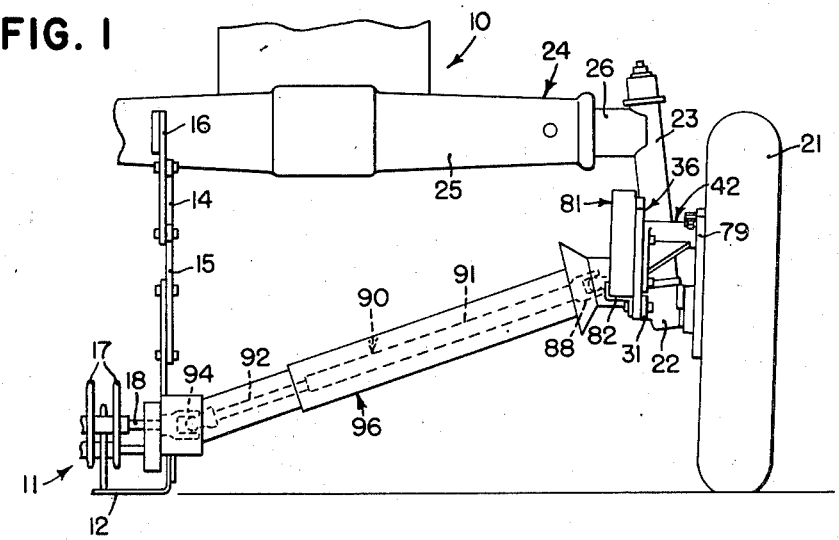
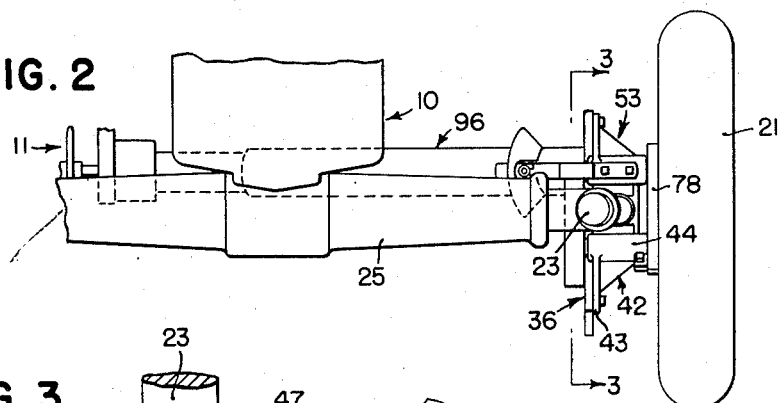
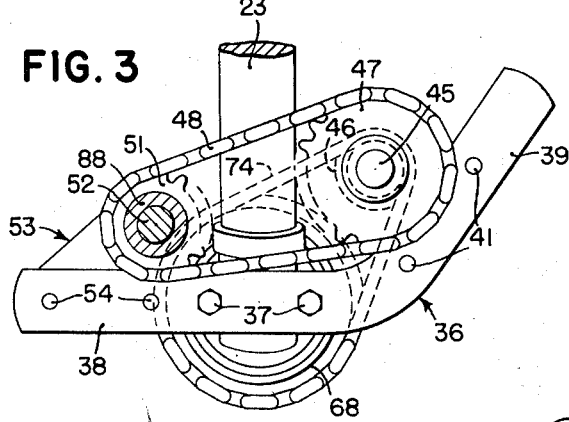

2,785,525

FINDER WHEEL DRIVE

Knud B. Sorensen, Rock Island, and Harold R. Lindstrom, Moline, Ill., assignors to Deere & Company, Moline, Ill., a corporation of Illinois Application July 16, 1954, Serial No. 443,885

10 Claims. (Cl. 56—121.4)

The present invention relates generally to agricultural implements and more particularly to beet harvesters and other machines or implements of like nature.

The object and general nature of the present invention is the provision of a tractor-mounted implement having a ground-engaging unit including operating parts, with means for driving at least certain of said parts from a ground wheel, such as, for example the front or rear wheel of the tractor, whereby such parts will always be driven at the correct speed relative to ground travel, irrespective of the rate at which other parts of the implement and/or the tractor are driven.

A further feature of this invention is the provision, in a beet harvester, of means for driving the finder wheel unit, which is movable generally vertically relative to the tractor during operation, from a ground wheel, such as one of the wheels of the tractor, and still further, another feature of this invention is the provision of drive means interconnecting the finder wheel unit with the front wheel of the tractor, so constructed and arranged that the normal steering movements of the front wheel of the tractor do not objectionably affect the transmission of the drive to the finder unit. Still further, a feature of this invention is the provision of means for transmitting a power drive from the front wheel of the tractor to a driven part of an associated implement unit, the driving parts being constructed and arranged so as to be disposed closely adjacent the axis of steering movement of the tractor wheel, whereby steering movements of the latter do not objectionably affect the transmission of power from the wheel to the unit to be driven thereby. An additional feature of this invention is the provision of means whereby the drive may readily be disconnected when the implement is to be transported from place to place.

These and other objects and advantages of this invention will be apparent to those skilled in the art after a consideration of the following detailed description, taken in conjunction with the accompanying drawings, in which:

Fig. 1 is a front view showing a drive incorporating the principles of the present invention and constructed and arranged to transmit power from the front wheel of a tractor to the finder wheel unit of an associated beet harvester.

Fig. 2 is a partial plan view of the structure shown in Fig. 1.

Fig. 3 is a fragmentary detail view, taken generally along the line 3—3 of Fig. 2, several parts being shown in section.

Fig. 4 is an enlarged fragmentary perspective view showing the parts mounted in operative relation on the front wheel and associated portions of a tractor.

Fig. 5 is an enlarged fragmentary perspective view showing the driving and driven parts that are mounted directly on the front tractor wheel, certain of the parts being broken away and shown in section.

Fig. 6 is a fragmentary view similar to Fig. 4, showing a modified form of the present invention in which a slip clutch is incorporated.

Referring first to Figs. 1 and 2, a mobile unit in the form of a tractor is indicated in its entirety by the reference numeral 10 and is utilized for the support and propelling agency of a beet harvester that, in the present instance, is represented by driven means in the form of a front-mounted finder wheel unit 11 with which is connected a topping knife 12 that serves as a part of the unit 11. The latter is connected in any suitable way with the tractor to be raised and lowered into and out of transport and operating positions, such connecting means including parallel links 14 and 15 and suitable tractor-mounted brackets 16. The finder wheel unit includes a plurality of finder wheels 17 connected to be driven by the rotation of a finder wheel shaft 18. The finder wheel unit is substantially like that shown in the patent to Walz et al. 2,433,799, issued December 30, 1947, except that, in the present instance, the finder wheel unit is adapted to be driven by a direct connection with any suitable or convenient ground engaging wheel or wheels, such as, for example, the front or rear wheel of the tractor. Means providing the direct connection forms the principal subject matter of the present invention.

The front wheel of the tractor is indicated by the reference numeral 21 and is mounted for rotation on the lower end of a front wheel spindle 22, the latter being mounted for steering movement about a generally vertical axis within a sleeve section 23 that is disposed generally vertically and at its upper end is connected with a laterally extensible front axle structure 24. According to the principles of the present invention, particularly the broader aspects thereof, the front tractor wheel 21 represents any suitable or convenient ground driven wheel. The axle structure 24 includes an outer sleeve section 25 and an inner sleeve section 26 to the outer end of which the sleeve section 23 is rigidly connected, as by welding as shown in Figure 4. As best shown in Fig. 4, the sleeve sections 25 and 26 of the front axle structure are provided with a plurality of openings, as at 28, whereby the wheel tread may be adjusted as required for the crop conditions encountered. A locking bolt 29 is insertable in registering openings to provide for securing the tread adjustment desired. An attaching pad 31 (Fig. 5) is carried at the lower end of the spindle and is provided with a pair of apertured sections 32 for the reception of tools and other attachments that it may be desired to connect to the tractor. According to the principles of the present invention, the attaching pad or lug 31 is made use of to receive parts of the means providing the direct drive from the front tractor wheel 21 to the finder wheel or operating unit 11.

Referring first to Fig. 3, a support bar 36 is secured, as by bolts 37 extending through the openings 32, to the lower end of the front wheel spindle 22 and turns whenever the steering wheel is turned. The support bar 36 includes a lower generally straight portion 38 and an upwardly extending portion 39. The latter portion is apertured to receive a pair of bolts 41 that secure a bearing housing in the form of a housing member 42 (Fig. 4) to the support bar 36, the housing 42 having a lower attaching flange 43 that is slotted (not shown) to receive the connecting bolts 41. The housing 42 also includes a cylindrical section 44 that serves as a bearing housing in which a shaft 45 is journaled for rotation. A sprocket pinion 46 is secured to the inner end of the shaft 45 and a sprocket gear 47 is secured to the outer end of the shaft 45. A sprocket chain 48 is trained over the sprocket gear 47 and over a sprocket pinion 51 that is connected with the outer end of a shaft 52, which latter shaft is supported in a second bearing housing or housing member 53 secured, as by bolts 54, to the rear portion 38 of the support bar 36. The outer end of the shaft 52 receives a universal joint 88 (Fig. 1), referred to later, that is connected to drive the finder wheel unit by means which will also be described later.

As best shown in Fig. 5, a drive member 61 is fixed, as by a plurality of stud bolts 62 (only one of which is shown), to the front wheel 21, the drive member 61 including an apertured flange section 63, receiving the bolts 62, and a hub section 64 on which a driven member 66 is mounted. The bolts preferably are inserted into the flange 63 from the outer side of the front wheel 21. The member 66 is similar to the member 61 in that it comprises a flange section 67 and a hub portion 68 that is formed with or carries a driving sprocket section 69. The flange section 67 is apertured, as at 71, to receive a driving pin member 72, the pin member 72 being insertable through any one of the openings 71 and into any one of several threaded openings in the flange 63 of the drive member 61. When the driving pin member 72 is in place, the parts 61 and 66 rotate together, but when the pin 72 is removed, the member 66 remains stationary, riding idly on the hub section 64 of the member 61. As best shown in Fig. 3, a sprocket chain 74 is trained over the sprocket section 69 and over the pinion 46 that is fixed to the inner end of the shaft 45. The member 66, chain 74, sprocket 46, and associated parts constitute driving means connected with the outer end of the shaft 45 for driving the latter from the front wheel means 21. Thus, rotation of the front wheel 21 acts through the sprocket section 69 to drive the pinion 46 and the shaft 45, and rotation of the latter acts through the sprocket gear 47, the chain 48 and the sprocket pinion 51 to drive the universal joint 88 and the shaft 52 upon which the universal joint is mounted.

It is to be understood that the present invention is not necessarily limited to sprockets and sprocket gears.

The housing 42 is provided with a pair of outwardly extending lugs 77, one of which can be seen in Fig. 4, the other preferably being diametrically opposite, by which a pair of shield sections 78 and 79, enclosing the sprocket pinion 46, the chain 74 and the sprocket section 69, are held in place. The sprocket sections 47 and 51, together with the associated drive chain 48, are protected by a second shield structure, indicated at 81, the shield including a pair of attaching lugs 82 and 83 by which the shield 81 may be bolted in any suitable way to the support bar 36.

If desired, the sprocket gear 47 (Fig. 3) may be loosely mounted on the shaft 45 but connected with the latter through a slip clutch unit 85 (Fig. 6), whereby the parts are protected against breakage in case the finder wheel unit should become jammed or the like. The slip clutch 85 is per se of conventional construction, such as one like that shown in U. S. Patent 2,291,407, issued July 28, 1942, to T. W. Paul.

The inner end of the shaft 52, which is the end extending laterally inwardly of the tractor and away from the front wheel 21, carries the universal joint 88 mentioned above. Preferably, the sprocket pinion 51 is fixed directly to one of the members of the universal joint 88. The latter is connected with the adjacent end of a telescopic drive shaft unit indicated in its entirety by the reference numeral 90, best shown in Fig. 1. The unit 90 includes an outer sleeve-like drive shaft 91 and an inner shaft section 92, the outer end of the sleeve section 91 being connected to the other member of the universal joint 88. The inner end of the other shaft section 92 is connected by a universal joint 94 with the finder wheel shaft 18. The universal joint 88, shaft unit 90, universal joint 94 and associated parts constitute means connecting the inner end of the shaft 52 with the finder wheel shaft for driving the latter. The telescopic shaft parts 91, 92 are protected by a telescopic shield section 96, one end of which is supported, as at 97, by bracket means that is bolted to the housing 53, and the other end of the shield structure is carried on the finder wheel unit. As will best be seen in Fig. 3, the shaft section 52 is located closely behind the axis of the spindle 22, and hence steering movements imparted to the spindle 22 having only a minimum effect so far as angling the universal joints 88 and 94 and causing the telescopic shaft parts 91 and 92 to extend or retract are concerned. The shaft sections 91 and 92 are of sufficient length to accommodate practically all front wheel tread settings and, in addition, any extension or retraction incident to steering movement of the front wheel 21.

While we have shown and described above the preferred structure in which the principles of the present invention have been incorporated, it is to be understood that our invention is not to be limited to the exact details shown and described above but that, in fact, widely different means may be employed in the practice of the broader aspects of our invention.

What we claim, therefore, and desire to secure by Letters Patent is:

We claim:

1. In a tractor-mounted beet harvester including a front wheel means, a topping knife, a finder wheel unit, means movably connecting said topping knife and finder wheel unit with the tractor for generally vertical movement relative thereto, and means for driving said finder wheel unit from said front wheel means, including a pair of parts, one being mounted for rotation on the other and one being connected to said front wheel means, there being apertures in said parts adapted to be brought into alignment, and a detachable driving pin disposed in said apertures.

2. In a beet harvester, a frame, a ground wheel connected with the frame, a finder wheel unit, means connecting the finder wheel unit with the frame and supporting the finder wheel unit for generally vertical movement relative to the ground wheel, and means for driving said finder wheel unit from said ground wheel, including a pair of relatively rotatable parts mounted on said ground wheel, means connecting one of said parts with said finder wheel unit and the other with said ground wheel, and means optionally engageable with said parts for locking them together so as to drive said finder wheel unit from said ground wheel.

3. In an agricultural implement adapted to be mounted on a tractor and having a driven means, said tractor having a front steerable wheel spindle turnable about an axis, the improvement comprising means for driving said driven means from said tractor front wheel, comprising a generally fore-and-aft extending support adapted to be fixed to the wheel spindle to turn therewith, a shaft, means on said support rotatably receiving said shaft and supporting the latter so that the shaft is moved with said support and spindle about said axis, a sprocket attachable to a front wheel of the tractor, a sprocket pinion on one end of said shaft, a sprocket chain trained over said sprocket and pinion, and means including universal joint means to drive said driven means from said shaft and accommodating movement of the latter with said wheel spindle about said axis.

4. In an agricultural implement adapted to be mounted on a tractor and having a driven means, said tractor having a front steerable wheel spindle turnable about an axis, the improvement comprising means for driving said driven means from said tractor front wheel, comprising a generally fore-and-aft extending support adapted to be fixed to the wheel spindle to turn therewith about said axis, a bearing housing fixed to said support, a shaft rotatable therein, means connected with said shaft and with the tractor for driving said shaft from the tractor front wheel, a bearing housing fixed to said support adjacent the axis of said spindle, a second shaft rotatable in said housing, a universal joint fixed to said second shaft adjacent said axis, means connected between said universal joint and said first shaft to drive said universal joint from said first shaft, and extensible and retractable shaft means connecting said universal joint with said driven means.

5. In an agricultural implement having a driven means and adapted to be connected with a tractor having a front axle structure that includes front wheel means and a steerable wheel spindle turnable about a generally vertical axis, said driven means being located a given distance rearwardly of said front axle structure, the combination therewith of a support attachable to said spindle and turnable therewith during steering of said front wheel means, a transverse housing member fixed to said support generally rearwardly of said spindle, a shaft journaled in said housing member, driving means connected with said front wheel means and with one end of said shaft for driving the latter from said front wheel means, and means including telescopic shaft means and universal joint means to connect the other end of said shaft with said implement driven means, said housing member being located closely behind said spindle whereby said universal joint means is subject to minimum angular displacement.

6. In an agricultural implement having a driven means and adapted to be connected with a tractor having a front axle structure that includes front wheel means and a steerable wheel spindle turnable about a generally vertical axis, the combination therewith of a support attached to said spindle and turnable therewith during steering of said front wheel means, said support extending both fore-and-aft of said spindle, a transverse housing member fixed to said support generally rearwardly of said spindle, a second transverse housing member fixed to said support generally forwardly of said spindle, a shaft journaled in each of said housing members, driving means connected with the outer end of one shaft for driving the latter from the front wheel means, means connected with the inner end of the other shaft for driving said driven means, and means driving said other shaft from said one shaft.

7. In an agricultural implement having a driven means and adapted to be connected with a tractor having a front axle structure that includes front wheel means and a steerable wheel spindle turnable about a generally vertical axis, the combination therewith of a support attachable to said spindle and turnable therewith during steering of said front wheel means, said support extending both fore-and-aft of said spindle, a transverse housing member fixed to said support generally rearwardly of said spindle, a second transverse housing member fixed to said support generally forwardly of said spindle, a shaft journaled in each of said housing members, driving means disposed between said spindle and said front wheel means and connected with the outer end of one shaft for driving the latter from the front wheel means, drive means disposed at the laterally inner side of said spindle and connected with the inner end of the other shaft and said driven means for driving said driven means, and means connected with said shafts and said drive means for driving said other shaft and said drive means from said one shaft.

8. In an agricultural implement having a driven means and adapted to be connected with a tractor having a front axle structure that includes front wheel means and a steerable wheel spindle turnable about a generally vertical axis, the combination therewith of a support attached to said spindle and turnable therewith during steering of said front wheel means, said support extending both fore-and-aft of said spindle, a transverse housing member fixed to said support generally rearwardly of said spindle, a second transverse housing member fixed to said support generally forwardly of said spindle, a shaft journaled in each of said housing members, driving means connected with the outer end of one shaft for driving the latter from the front wheel means, slip clutch means connected with the inner end of said one shaft, and means connected with said slip clutch means and with the other shaft for driving the latter and said driven means.

9. In an agricultural implement having a driven means and adapted to be connected with a mobile unit having a ground engaging wheel, the combination therewith of a first part fixed to said wheel, a second part mounted for rotation on a portion of said first part, means connecting said driven means with said second part, and means optionally connecting said second part with said first part to cause them to rotate together with said ground wheel and drive said driven means.

10. In an agricultural implement having a driven means and adapted to be connected with a mobile unit having a ground engaging wheel, the combination therewith of a first part fixed to said wheel, and having a hub, a second part mounted on said hub, said parts having adjacently disposed flanges, means connecting said driven means with said second part, and means optionally connecting said flanges so as to cause said parts to rotate together with said ground wheel and drive said driven means.

References Cited in the file of this patent
UNITED STATES PATENTS

| | | |
|---|---|---|
| 1,025,755 | Lotter | May 7, 1912 |
| 1,301,328 | Smith | Apr. 22, 1919 |
| 1,548,888 | Kiest | Aug. 11, 1925 |
| 2,259,908 | Raney | Oct. 21, 1941 |
| 2,433,799 | Walz et al. | Dec. 30, 1947 |
| 2,637,964 | Orendorff | May 12, 1953 |